Dec. 14, 1965    G. F. QUAYLE    3,223,434
PALLET TRUCK COUPLING
Filed June 28, 1963    2 Sheets-Sheet 1
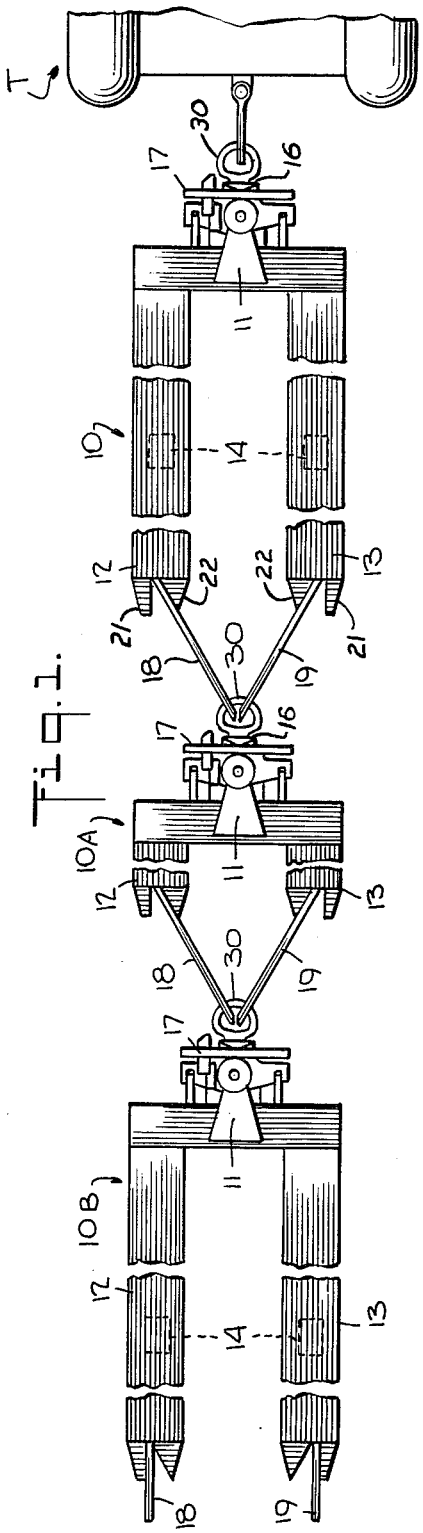
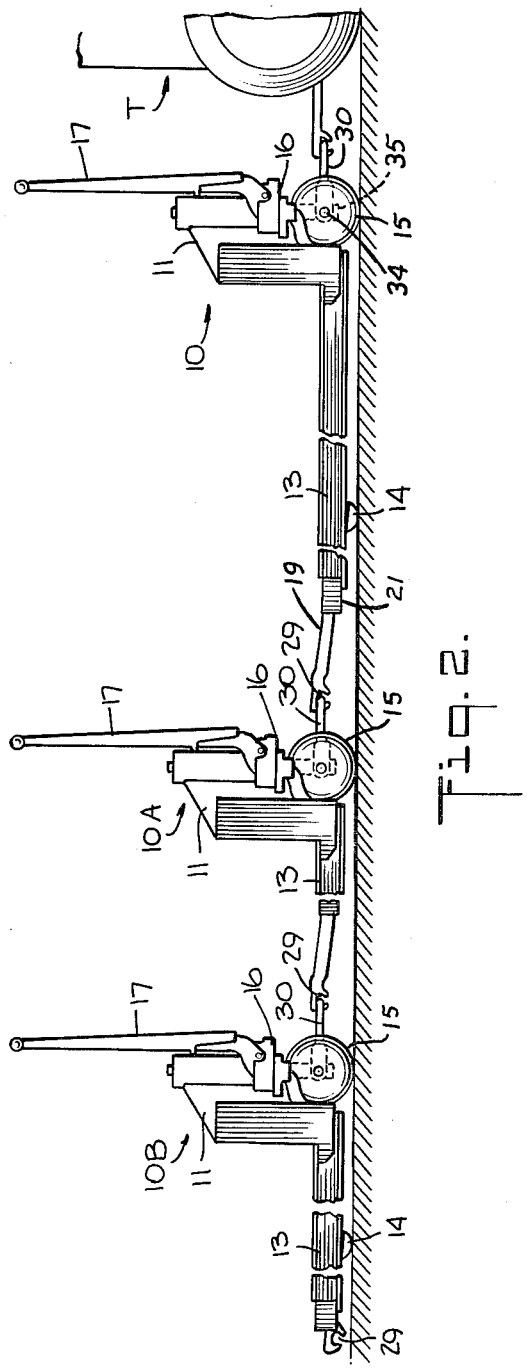
INVENTOR.
GEORGE F. QUAYLE
BY
ATTORNEY

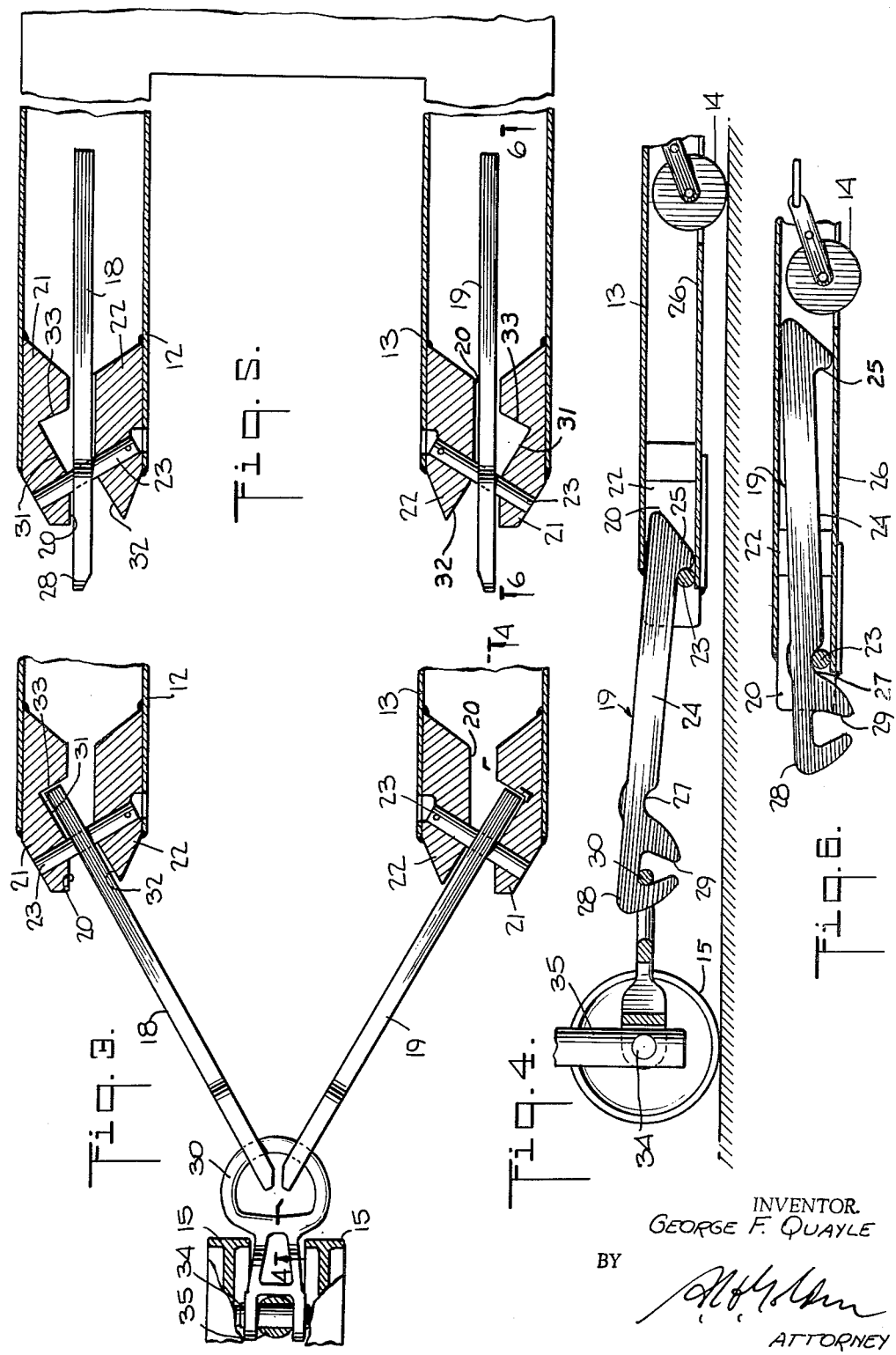

United States Patent Office 3,223,434
Patented Dec. 14, 1965

3,223,434
PALLET TRUCK COUPLING
George F. Quayle, Philadelphia, Pa., assignor, by mesne assignments, to Yale & Towne, Inc., New York, N.Y., a company of Ohio
Filed June 28, 1963, Ser. No. 291,465
16 Claims. (Cl. 280—456)

My invention relates to a novel coupling for a pallet truck.

Those skilled in the art will appreciate that pallet trucks are equipped with a pair of rearwardly disposed lifting legs that will enter into lifting position in a pallet when the truck moves rearwardly. Standard pallets generally have at least one center support, and the truck legs must enter at either side of that support. Obviously, the space between the legs of the truck must be open to allow clearance so that the truck can readily maneuver relatively to the pallet. That makes it difficult to equip a pallet truck with means that will couple the truck to a trailing vehicle, and no very satisfactory way of doing that has been found until the present time, insofar as I am aware.

I have now conceived by my invention an extremely novel construction that will very effectively enable a pallet truck to be coupled to a trailing truck or vehicle, but that will not interfere with loading and unloading operations of the pallet truck.

As a feature of my invention, I utilize a pulling hook bar that is adapted to lie within an internal chamber on a truck, and that is mounted for movement outwardly relatively to the chamber into an extended position for engaging a trailer. Further, I arrange means to coact between the pulling hook bar and the truck for retaining the bar inwardly of said chamber when in the chamber, and outwardly of said chamber when in extended position.

As a more particular feature, my novel construction has means that will be effective when a pulling hook bar is moved to an angular position to retain the bar outwardly of a chamber on the truck. Through a movement of the bar away from said angular position, the bar will be released for inward movement to a position within the chamber.

To utilize my invention on a pallet truck, I equip each load supporting leg of the truck with one of the elongated pulling hooks or bars. Each truck leg is constructed to support its pulling hook in a retracted position, preferably having a longitudinal opening or chamber in which the hook or bar will be housed. The pulling hooks are mounted for movement outwardly of the legs to extended positions in which the outer ends of the hooks are juxtaposed for engagement with a trailer, the hooks then being automatically retained in extended position so as to maintain the pallet truck and trailer in an effective relation to each other.

My invention may be used to particular advantage in those cases in which a number of separate loads are to be moved over the same route. Thus, the loads can be collected on pallet trucks of the type that are hand operated, after which those trucks may be assembled in a train and pulled to a particular destination or individual destinations by a single tractor, or possibly by a power operated pallet truck. When uncoupled, the trucks may readily be maneuvered by hand, and unloaded in the usual way at the desired point. It will be appreciated that a separate operator will not be required for each truck during a large part of its travel. Also, a relatively costly powered truck need not be used for each load. Thus, my invention will enable the cost of a load handling operation to be very considerably reduced.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which may disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing:

FIG. 1 shows a plan view, partly broken away, of several pallet trucks utilizing my invention to couple them in a trailer train.

FIG. 2 shows a side view.

FIG. 3 is a section showing details of my invention with the pulling hooks on one truck extended and engaged with a trailing truck.

FIG. 4 shows a section on the broken line 4—4 in FIG. 3.

FIG. 5 shows a view somewhat like FIG. 3 but with the pulling hooks in housed position.

FIG. 6 is a section on the line 6—6 in FIG. 5.

Referring now more particularly to FIGS. 1 and 2 of the drawings, I show a series of pallet trucks 10, 10A and 10B arranged in a trailer train pulled by a tractor T. Each truck 10, 10A and 10B has certain features that are standard in pallet trucks, including a lifting head 11 and a pair of lifting legs 12, 13 that are disposed rearwardly in spaced relation to each other for entering a pallet, not shown. Each leg 12, 13 has a hollow construction forming a chamber, as may be seen in FIGS. 3 through 6, being formed from steel plate to channel or tubular shape. As will be understood, each pallet truck has mechanism (not shown), that may be actuated to lift the legs 12, 13 on the lifting head 11 and on rear load wheels 14, whereby to lift and to support the pallet on the legs. One or more front wheels 15 are supported through a steering mounting 16 for steering rotation on lifting head 11.

Each steering mounting 16 has a usual steering handle 17 that is shown in a vertical position in FIGS. 1 and 2, but that can be swung downwardly so that an operator can use it for steering and pulling the truck when the truck is uncoupled and is to be operated by hand. As thus far described, the construction of the pallet trucks 10, 10A and 10B may be conventional and will be understood by those persons skilled in the art. However, it will be well to recall here that the center support of a pallet will be accepted between the truck legs 12, 13 when the legs enter the pallet. Thus, it will be appreciated that the space between legs 12, 13 must be open in a rearward direction during loading and unloading operations of the truck.

In my invention, I utilize a pair of elongated pulling hooks or bars 18, 19 that are mounted on the legs 12, 13 on each pallet truck 10, 10A and 10B. As best shown in FIGS. 3 through 6, each pulling hook or bar 18, 19 is arranged in a longitudinal guide opening 20 through the use of a pair of blocks 21, 22 that are spaced relatively to each other and that are welded within each leg 12, 13. Each pair of blocks 21, 22 in effect forms a bifurcated rear end on a particular leg, the guide opening 20 extending between the blocks.

I equip each pair of blocks 21, 22 with a cross pin 23, which is integrally secured in inclined openings in the blocks so as to lie in an angular position across a lower part of the longitudinal guide opening 20. As indicated in FIGS. 4 and 6, each of the pulling hooks or bars 18, 19 has a shank portion 24 which is adapted to slide on the cross pin 23, while the inner end of the hook has a lug 25 that slides on a lower surface 26 of the truck leg. Thus, each pulling hook 18, 19 is mounted to slide relatively to a position housed within the corresponding longitudinal guide opening 20. The lug 25 will coact with cross pin 23 to limit outward sliding of the hook, thus retaining the hook when in a projected position relatively to the particular truck leg 12 or 13.

The shank portion 24 of each pulling hook 18, 19 rests by gravity on the cross pin 23, and is formed on its lower surface with a dwell 27 that will accept the cross pin 23, as shown in FIG. 6, when the hook slides to a retracted position housed within the truck leg. Thus, each cross pin 23 may hold a hook 18, 19 in housed position, but the hook can slide to projected position if it first is lifted to disengage dwell 27 from cross pin 23. Each pulling hook 18, 19 also has an outer end portion 28 which is formed on its lower surface with a hook opening 29, that opening having a relatively narrow entrance and adapted to engage a coupling eye 30, FIG. 4, as will be described.

Referring now to FIGS. 3 and 5, I call attention to the fact that I form each pair of blocks 20 and 21 with inclined surfaces 31, 32 extending in opposed directions from the longitudinal opening 20. Those surfaces 31, 32 are so arranged as to allow the pulling hooks 18, 19, when projected longitudinally relatively to the truck legs 12, 13, to be swung on the cross pins 23 in a lateral direction toward the center line of the pallet truck. When the outer end portions 28 of the pulling hooks swing into juxtaposed relation, as shown in FIG. 3, the inclined surfaces 31, 32 will hold the opposed inner ends of the hooks so that they will not shift bodily in a lateral direction on cross pins 23. Moreover, I form each block 21 with a locking surface 33 that is in opposed relation to the inner end of the particular hook when the hook is swung, and that coacts with the cross pin 23 to lock the hook against longitudinal movement relatively to the truck leg.

A coupling eye 30, to which I have already referred, is secured to the steering mounting 16 at the front of each truck 10, 10A, 10B. As shown, the eye 30 is assembled on the axle 34 of the steering wheels 15, the axle 34 being supported on a post 35 which is a part of the steering mounting 16. Actually, the details whereby the coupling eyes 30 are mounted are not important to an understanding of my invention, and it is merely necessary to know that each truck has a coupling part 30 through which it may be pulled and steered, and which will readily allow hand operation of the truck through the handle 17, at those times when that is desired.

It will now be seen that the pulling hooks 18, 19 on the legs of a particular pallet truck are adapted to maintain an effective relation between that truck and a trailing truck. Thus, with the outer ends of pulling hooks 18, 19 juxtaposed to each other and engaged with the eye 30 on the trailing truck, each hook will be locked relatively to the pulling truck so as to accept both pulling and pushing forces. Thereby the pulling truck will very effectively steer the trailing truck, and also will hold the trucks in an effective relation to each other when the pulling truck stops or for some reason needs to apply a pushing force to the trailing truck.

While the novel concept of my invention enables a pallet truck to be very successfully operated in a train, my construction nevertheless will not interfere with the loading and unloading operations of the pallet truck. Thus, the pulling hooks 18, 19 when disengaged from the trailing truck may very easily be moved to positions that are housed within the legs of the pallet truck. Hooks 18, 19 then will be retained in housed position, leaving free the space between and about the truck legs. It will be appreciated that the pallet truck then can be maneuvered and operated by hand in a normal manner, and the legs of the truck will allow full clearance for maneuvering the truck relatively to a pallet. When the pallet has been loaded on the pallet truck, or unloaded if that is the case, it will be a simple matter again to couple the truck to a trailing truck or vehicle.

I have referred in my description to a truck that is hand operated, but it is to be understood that features of my invention can be used to advantage in a power operated pallet truck. That truck then can be coupled to a trailing truck so as to act as a tractor. Therefore, I do not wish to be limited to a hand operated truck.

I now believe that the operation and the advantages of my novel pallet truck will be understood, and that the very considerable merits of my invention will be fully appreciated by those skilled in the art.

I now claim:

1. In a truck of the class described, a pair of rearwardly disposed legs adapted to enter a pallet so as to move to a position for lifting and supporting the pallet, an elongated pulling hook mounted on each pallet supporting leg for movement between a retracted position housed within the leg and an extended position for engaging a trailer, and means coacting on each pulling hook and its leg for retaining the hook when in extended position so that the truck will act through the pulling hooks to pull the trailer.

2. In a truck of the class described, a pair of rearwardly disposed legs adapted to enter a pallet so as to move to a position for lifting and supporting the pallet, a rear end portion of each leg constructed to form a longitudinal opening in the leg, an elongated pulling hook mounted to slide in each of said leg openings between a position housed within the leg, and a position extended relatively to said leg, and means retaining the pulling hooks relatively to the pallet supporting legs when the hooks are extended and engaged with a trailer for pulling the trailer.

3. In a truck of the class described, a pair of rearwardly disposed legs adapted to enter a pallet so as to move to a position for lifting and supporting the pallet, a rear end portion of each leg constructed to form a longitudinal opening in the leg, an elongated pulling hook mounted to slide in each of said leg openings, means coacting on each pulling hook and pallet supporting leg for releasably holding the hooks in a retracted position housed within the legs, and means retaining the pulling hooks relatively to the pallet supporting legs when the hooks are extended and engaged with a trailer for pulling the trailer.

4. In a truck of the class described, a pair of rearwardly disposed legs adapted to enter a pallet so as to move to a position for lifting and supporting the pallet, an elongated pulling hook mounted on a rear end portion of each pallet supporting leg for movement between a position retracted relatively to the leg and an extended position for engaging a trailer, a detent mounted in position to coact with the pulling hook on the rear end portion of each pallet supporting leg, a portion on each pulling hook engaged by said detent for releasably holding the hook in retracted position, and a further portion on each hook engaged behind said detent to retain the pulling hooks when in extended position so that the truck will act through said hooks to pull the trailer.

5. In a truck of the class described, a pair of rearwardly disposed legs adapted to enter a pallet so as to move to a position for lifting and supporting the pallet, an elongated pulling hook mounted on a rear end portion of each leg for sliding relatively to a position housed within the leg and also for limited vertical movement, a cross pin mounted on the rear end portion of each leg and on which the lower surface of its elongated pulling hook slides, a dwell formed in said lower surface of each hook and coacting with the cross pin for holding the hook against sliding when in housed position, each pulling hook being slidable to position extended relatively to its leg upon lifting of the hook to disengage its dwell from the cross pin, and lugs on the pulling hooks engaging behind the cross pins to retain the hooks relatively to the pallet supporting legs when the hooks are extended and engaged with a trailer for pulling the trailer.

6. In a truck of the class described, a pair of load supporting legs disposed rearwardly and in spaced relation to each other on the truck, an elongated pulling hook adapted to lie in a retracted position on each load supporting leg, said pulling hooks in retracted position leaving free the space between and about the load supporting legs for manipulation of said legs relatively to a load, and means mounting said pulling hooks for movement on said legs to an extended position in which the outer ends of the hooks are juxtaposed to each other for engaging a trailer coupling part behind the space between the load supporting legs.

7. In a truck of the class described, a pair of load supporting legs disposed rearwardly and in spaced relation to each other on the truck, a longitudinal opening in the rear end portion of each load supporting leg, an elongated pulling hook adapted to lie in a position housed within each leg opening, said pulling hooks in housed position leaving open the rear end of the space between the load supporting legs for manipulation of said legs relatively to a load and means mounting said pulling hooks for sliding and swinging movement from housed position to a rearward extended position in which the outer ends of the hooks are juxtaposed to each other for engaging a trailer coupling part behind said space between the load supporting legs.

8. In a truck of the class described, a pair of load supporting legs disposed rearwardly and in spaced relation to each other on the truck, an elongated pulling hook adapted to lie in a retracted position relatively to each load supporting leg, means mounting said pulling hooks for longitudinal sliding and lateral swinging movement from retracted position on said legs to an extended position in which the outer ends of the hooks are juxtaposed to each other for engaging a coupling part on a trailer, and means coacting on said pulling hooks and load supporting legs to lock each hook against retracting movement relatively to its legs when the hooks are swung toward said extended position so that said hooks will maintain an effective relation between the truck and the trailer.

9. In a truck of the class described, a pair of rearwardly disposed legs adapted to enter a pallet so as to move to position for lifting and supporting the pallet, an elongated pulling hook slidable relatively to a retracted position on each load supporting leg, means engaging when each pulling hook slides to a projected position to retain the hook relatively to its leg, and means movable into opposed relation to one another on each pulling hook and load supporting leg to lock the hook against sliding while the hook is in projected position, so that the truck may act through the pulling hooks for both pulling and pushing a trailer.

10. In a truck of the class described, a pair of load supporting legs disposed rearwardly and in spaced relation to each other on the truck, a rear end portion of each leg constructed to form a longitudinal opening in the leg, an elongated pulling hook mounted in each longitudinal opening for sliding relatively to a position housed in the load supporting leg, means coacting on each pulling hook and leg when the hook slides from housed position to a projected position whereby to support the hook for swinging movement on the leg, and surfaces on each pulling hook and load supporting leg brought into opposed relation to each other through the swinging movement of the hook whereby to lock the hook against sliding, so that the truck may act through the hooks for both pushing and pulling a trailer.

11. In a truck of the class described, a pair of rearwardly disposed legs adapted to enter a pallet so as to move to a position for lifting and supporting the pallet, a rear end portion of each pallet supporting leg constructed to form a longitudinal guide opening in said leg, an elongated pulling hook mounted for sliding in the guide opening of each pallet supporting leg between a position housed in the leg and a projected position, a cross pin mounted in the guide opening on each pallet supporting leg, a lug formed on an inner portion of each pulling hook and engaging the cross pin when the hook slides to projected position, said rear end portions of the legs formed to allow clearance for swinging of the pulling hooks to angular positions while their lugs are engaged with the cross pins, and a surface in opposed relation to the cross pin on each pallet supporting leg and coacting with a surface on each pulling hook to lock the hook against sliding movement when the hook is in angular position, so that the truck may act through the pulling hooks for both pushing and pulling a trailer.

12. In a truck of the class described, a pair of rearwardly disposed legs adapted to enter a pallet so as to move to a position for lifting and supporting the pallet, a pair of guide blocks mounted in spaced relation to each other on the rear end portion of each pallet supporting leg and forming a longitudinal guide opening in said leg, an elongated pulling hook mounted for sliding in the guide opening of each pallet supporting leg between a position housed in the leg and a projected position, a cross pin in the guide opening between each pair of guide blocks, a lug formed on an inner portion of each pulling hook and engaging the cross pin to retain the hook relatively to the pallet supporting leg when the hook slides to projected position, said guide blocks formed to allow clearance for swinging of the pulling hooks to angular positions while the hooks are retained by said cross pins, and a surface on each pair of guide blocks in opposed relation to each cross pin and coacting with a surface on the pulling hook to lock the hooks against inward sliding movement when the hooks are in angular position, whereby to enable the truck to act through the pulling hooks for both pulling and pushing a truck.

13. In a truck of the class described, a pair of load supporting legs disposed rearwardly and in spaced relation to each other on the truck, a longitudinal guide opening in the rear end portion of each load supporting leg, an elongated pulling hook mounted in each guide opening for sliding relatively to a position housed within each load supporting leg, said pulling hooks in housed position leaving open the rear end of the space between the load supporting legs for manipulation of said legs relatively to a load, a cross pin mounted in the guide opening on each load supporting leg, a lug formed on an inner portion of each pulling hook and engaging the corresponding cross pin to retain the hook relatively to the load supporting leg when the hook slides to a projected position, said guide openings formed with enlarged portions to allow clearance for lateral swinging of the pulling hooks while retained by the cross pins and lugs, said hooks being swingable to angular positions in which the outer ends of the hooks are juxtaposed to each other for engaging a trailer at a point behind the space between the load supporting legs, and surfaces in opposed relation to the cross pins on the load supporting legs and coacting with the pulling hooks when in said angular positions to lock the hooks against sliding whereby to maintain an effective relation between the truck and trailer.

14. In a truck of the class described, a pulling hook bar formed with an elongated shank, a hook portion and a lug portion on opposed ends of said elongated shank, said hook portion adapted to engage a coupling part on a trailer, a bearing part and guide surface means on said truck coacting with said shank and said lug portion to mount the pulling hook bar for sliding in a longitudinal direction relatively to the truck, said lug portion moving toward the bearing part when said pulling hook bar slides to a projected position relatively to the truck, and angular surface means located on said truck in juxtaposition to said guide surface means so formed in opposed relation to said bearing part on the truck that an angular movement of the pulling hook bar will place its lug portion between said angular surface means and said bearing part, whereby to hold the bar against sliding movement on the truck.

15. In a truck of the character described in claim 14 wherein said guide surface means comprises a pair of spaced blocks having a first pair of parallel faces opposing each other and said angular surface means comprises a second pair of parallel faces in said spaced blocks opposing each other, said second pair of parallel faces being angularly disposed with respect to said first pair of parallel faces.

16. In a truck of the class described, a frame portion of the truck having an internal chamber, a pulling hook bar within said chamber and moveable outwardly relatively to said chamber into an extended position for engaging a trailer or the like, angular surface means comprising a pair of spaced blocks having parallel faces angularly disposed relatively to the longitudinal axis of said chamber and mounted in spaced relation within said chamber, portions of said pulling hook bar and said angular surface means placed into locking contact with one another through manipulation of said bar relatively to said frame portion for retaining said bar in position outwardly of said chamber and for holding said bar against movement outwardly or inwardly of said chamber from an extended position relatively to said chamber, said portions on said bar and said angular surface means being released from said locking contact through manipulation of said bar whereby to allow movement of said bar relatively to said chamber.

References Cited by the Examiner
UNITED STATES PATENTS

| | | | |
|---|---|---|---|
| 1,650,767 | 11/1927 | Odiorne | 280—514 X |
| 2,195,636 | 4/1940 | Ulrich | 280—491 |
| 2,415,479 | 2/1947 | Forney | 280—482 |
| 2,576,383 | 11/1951 | Avery | 280—491 |
| 2,600,959 | 6/1952 | Bender | 280—498 |
| 2,859,050 | 11/1958 | Stonerock et al. | 280—491 |
| 2,914,343 | 11/1959 | Roth | 280—491 |
| 2,944,836 | 7/1960 | Matthews | 280—491 |

BENJAMIN HERSH, *Primary Examiner.*

A. HARRY LEVY, *Examiner.*